US006966029B1

(12) United States Patent
Ahern

(10) Patent No.: US 6,966,029 B1
(45) Date of Patent: Nov. 15, 2005

(54) SCRIPT EMBEDDED IN ELECTRONIC DOCUMENTS AS INVISIBLE ENCODING

(75) Inventor: Keith Thomas Ahern, Santa Clara, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/456,897

(22) Filed: Dec. 8, 1999

(51) Int. Cl.[7] .............................................. G06F 17/00
(52) U.S. Cl. ..................................... 715/529; 715/530
(58) Field of Search ............................... 707/505, 513; 715/605, 513, 530, 505, 529, 531

(56) References Cited

U.S. PATENT DOCUMENTS

| 5,937,160 A | * | 8/1999 | Davis et al. ................. 709/203 |
| 5,974,430 A | | 10/1999 | Mutschler, III et al. ..... 707/505 |
| 6,362,817 B1 | * | 3/2002 | Powers et al. ............... 345/419 |

FOREIGN PATENT DOCUMENTS

| EP | 0720336 A2 | 7/1996 | ........... H04L 29/06 |
| WO | 98/45793 | 10/1998 | ........... G06F 17/30 |

OTHER PUBLICATIONS

Simpson, Alan, "Mastering WordPerfect 5.1 & 5.2 Windows", 1993, SYBEX Inc., pp. 74-81, 108-109, 148-150, 944-945.*
Young, Margaret Levine et al., "WordPerfect 6.1 for Windows for Dummies", 1994, IDG Books Worldwide, Inc., 2nd Edition, pp. 161-178.*
Lemay et al., "Creating Commercial Web Pages", 1996, Sams.net Publishing, First Edition, pp. 4-5.*
Anawave Software: "New Web publishing software ushers users into the digital age; Hot Dog Pro 2.0 Web editing software allows users to create and publish their own Web site", Feb. 1996, Business Wire, pp. 1-2.*
"HotDog powers Web authors to new heights", Oct. 1996, Business Wire, pp. 1-2.*
Freund, Jim, "Barking up the right HTML tree. (Sausage Software's HotDog Professional 3.0 HTML editing tool for Web sites", Feb. 1997, Computer Shopper, vol. 17, No. 2, pp. 1-2.*
Freund, Jim, "HotDog Professional 5.1 Webmaster Suite: HotDog 5.1 Cuts the Mustard", Nov. 1998, Computer Shopper, vol. 18, No. 11, pp. 1-2.*

* cited by examiner

Primary Examiner—Sanjiv Shah
(74) Attorney, Agent, or Firm—Dicran Halajian

(57) ABSTRACT

Documents that contain content information and script information that controls user-interactivity with the document are encoded as a content section that is separate from the script information. The script information contains references to the content section, which typically comprises text information. By segregating the text information from the script, all text applications are able to display an undisturbed copy of the text information. In a preferred embodiment, the script is appended to the text information segment of the document, so that the direct display of the initial portion of the document is an immediately readable version of the text. In a second encoding method, which can be independent or combined with the first method, the script information is encoded using "invisible" sequences of characters. In one example embodiment, unique sequences of invisible characters, such as space, backspace, tab, etc., are used to encode each script element. In another example embodiment, the script elements are encoded as a sequence of visible characters and corresponding invisible characters that have the effect of erasing the visible characters from view, such as backspace characters. By invisibly encoding the script elements, the direct display of the document will appear as a text document, because the script elements will either be self-erasing, or attached to the text document as "invisible" white space.

10 Claims, 6 Drawing Sheets

110 — <FORM ACTION="http://www.philips/userreg/f0018" METHOD=POST ENCTYPE=application/x-www-form-urlencoded>
120 — <H1 ALIGN=CENTER>Welcome to Our Site</H1>
130 — <P ALIGN=LEFT>Thank you for visiting our site. We are anxious to provide the best service to our Registered Visitors. Please fill out the form below. </P>
</HR>
Name (First, Last) : <INPUT TYPE=TEXT NAME=UName> <BR>
Address: <TEXTAREA NAME=UAddress ROWS=3 COLUMNS=40>
<INPUT TYPE=SUBMIT>
</HR>
180 — <P ALIGN=CENTER>Thank You
</FORM>

Welcome to Our Site

Thank you for visiting our site. We are anxious to provide the best service to our Registered Visitors. Please fill out the form below.

Name (First, Last) : [          ]

Address: [                    ]

Submit

Thank You

FIG. 1 [Prior Art]

SCRIPT EMBEDDED IN ELECTRONIC DOCUMENTS AS INVISIBLE ENCODING

BACKGROUND OF THE INVENTION

1. Field of the Invention

This invention relates to the field of information processing, and in particular to the encoding of script information in electronic versions of documents and files.

2. Description of Related Art

Scripts are used to produce "interactive" documents, such as interactive forms, wherein a user can enter information, click selection buttons, and so on. Various techniques and programming languages have been developed to facilitate the development of scripts. For example, the HyperText Markup Language, HTML, is often used to encode script-enhanced documents. HTML is a collection of platform-independent styles, indicated by markup tags, that define the various components of a document. HTML tags are usually paired, marking the beginning and the end of the elements of the document to which the particular HTML style is applied. One example HTML style is a "FORM" that defines a segment of a document that is used to provide programmed elements for collecting information from a user, corresponding to identified fields on the form. Other scripting languages, some of which include the use of HTML encodings, are also commonly used to provide a programmed effect, such as JAVA, JAVASCRIPT, and so on.

FIG. 1 illustrates an example prior art HTML form file 100 that describes the rendering of an interactive form 200. The file 100 contains an HTML tag pair 110, 180 that defines the beginning and end of the form, respectively. Other segments of information and HTLM styles may precede and succeed the beginning and ending tags 110, 180 within the file 100. The beginning "<FORM" tag 110 includes an identification of a destination 111 to which the user's responses are to be communicated, and other parameters that indicate how the information that the user provides is to be communicated. Between the beginning 110 and end 180 of the form segment are HTML tags 120, 130, 150, 160, 170 that effect the rendering of an interactive form 200, via an HTML compatible application, such as a conventional web browser. The tag 120, for example, effects the rendering of the segment 121 of the document 100 as a centered heading, illustrated as 221 in the rendered form 200. In like manner, the text 131 is rendered as a left justified paragraph 231.

The tags 150 and 160 effect an interactive input field 250 and 260, respectively. The user enters a name in field 250 and an address in field 260. By the programmed effect associated with the tag 150, the name that the user enters in field 250 is assigned to a variable named "UName", as specified by the "NAME=" entry 151 in the tag 150. In like manner, the address that the user enters in the field 260 is assigned to the variable "UAddress", as specified by the "NAME=" entry 161 in the tag 160. The tag 170 effects the rendering of a "Submit" button 270. When user clicks on the "Submit" button 270, the HTML-compatible application provides the information assigned to each variable, UName and UAddress, to the destination 111 that is identified in the initial form tag 110.

Note that an application that is not HTML-compatible will not recognize the various tags 110–180, nor will it be able to distinguish information that is intended to be displayed from the HTML control information that is not intended to be displayed. That is, to an application that is not HTML-compatible, the HTML-format file 100 merely appears as a conventional text file. The displayed or printed form of the HTML-format file 100 via such an application will appear similar to the image of the HTML-format file 100 of FIG. 1. That is, all of the HTML-specific information, such as the tags 110, 120, and so on, will appear as part of the displayed document, as well as the text content 121, 131, and so on. Such a direct display of the HTML-format file 100 is visually unappealing, is often undecipherable to a user who is unfamiliar with the raw form of formatted computer files, and is virtually unusable as a form for collecting user information.

Note, also, that, in addition to an HTML-compatible application, the example script-based interactive form 100 requires a corresponding rendering device that can accommodate both a display of the relevant text information 221, 231, etc. as well as the input 250, 260, of user information. Some devices, such as printers, for example, are incompatible with interactive forms.

To provide compatibility among devices having differing capabilities, standards, such as MIME (Multipart Internet Mail Extension), have been developed. Using the MIME format, compatibility is provided by encoding the document in multiple formats. For example, the example document 100 might be encoded using the above HTML-Form encoding, followed by, or preceded by a "plain-text" encoding of the form. As its name implies, the plain-text encoding is an encoding of all of the printable text characters in the form, without any control codes, or tags, to effect the interactive features of the form. To effect the alternative renderings, each of the multiple formats are identified by a segment delimiter that identifies the beginning and end of each segment, the format used to encode the segment, and so on. When a MIME-format file is opened for rendering by an application, the application determines which segment to process, depending upon its capabilities, and the capabilities of the system upon which it is operating, including the capabilities of the device used to effect the rendering. If the application and system support interactive HTML-forms, for example, the application will process the segment of the document 100 between the tags 110, 180 that identify the form. Conversely, if the application or system is incapable of rendering interactive forms, or is not HTML-compatible, the plain-text encoding will be rendered. In this manner, using the MIME-format, applications that are not HTML-compatible can effectively process files that contain HTML segments, or other segments that contain formats that the application does not support, by ignoring the unsupported segments.

The proper display or printing of a document that contains alternative encodings with MIME-compatible segment delimiters, however, presupposes that the application is MIME-compatible. That is, it presupposes that the application recognizes each of the alternative encodings, and selects the appropriate encoding for processing and display. An application that is not MIME-compatible, however, will not recognize the various segments of the document for independent processing, and will typically produce a display that appears similar to the illustrated file 100, that is virtually unreadable.

BRIEF SUMMARY OF THE INVENTION

It is an object of this invention to provide a method of encoding an electronic document with text information and scripts that allows for an easy-to-read display of the text information regardless of the capabilities of the application used to display the document. It is a further object of this invention to obviate the need to encode the same text information into two different formats. It is a further object of this invention to "hide" the script information from a display of the text information.

These objects and others are achieved in several ways. In a first method, documents that contain text elements and a script information are encoded as a text document that is separate from the script information. The script information contains references to the text document. By segregating the text information from the script, all text applications are able to display an undisturbed copy of the text information. In a preferred embodiment, the script is appended to the text information of the document, so that the direct display of the initial portion of the document is an immediately readable version of the text. In a second method, which can be independent or combined with the first method, the script information is encoded using "invisible" sequences, or groups, of characters. In one example embodiment, unique sequences of invisible characters, such as space, backspace, tab, etc., are used to encode each script element. In another example embodiment, the script elements are encoded as a sequence of visible characters and corresponding invisible characters that have the effect of erasing the visible characters from view, such as backspace characters. By invisibly encoding the script elements, the direct display of the document will appear as an easy-to-read text document, because the script elements will either be self-erasing, or attached to the text document as "invisible" white space.

BRIEF DESCRIPTION OF THE DRAWINGS

The invention is explained in further detail, and by way of example, with reference to the accompanying drawings wherein:

FIG. 1 illustrates an example of a prior art HTML encoding of a script document.

Throughout the drawings, same reference numerals indicate similar or corresponding features or functions.

DETAILED DESCRIPTION OF THE INVENTION

Figure 2:
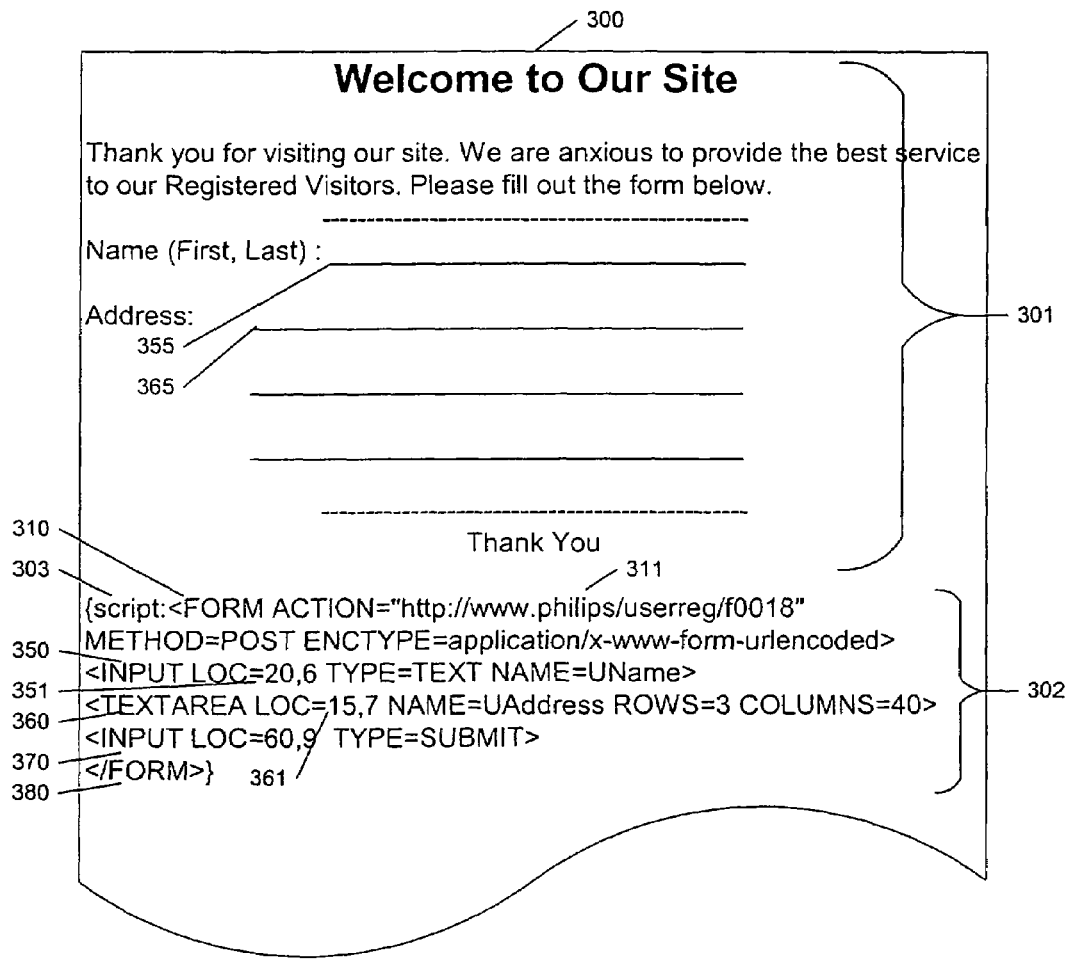
FIG. 2 illustrates an example of an encoding of a script document containing text elements and script elements that clusters the text elements in accordance with one aspect of this invention.

FIG. 2 illustrates an example of an encoding 300 of a script document in accordance with one aspect of this invention. The example encoding 300 corresponds to the HTML-encoded script document 100 of FIG. 1. As illustrated, the encoded document 300 includes a text section 301, and a script section 302. For ease of understanding, the content information, i.e. the information that does not control the rendering or user-interactivity with the document, is referred to as text, while the information that does control the rendering of the document is referred to as script. The text section 301 is an extraction, or clustering, of the content information of the document 100, without, for example, the above described HTML-tags that control the user-interactivity with the document 100. That is, all the letters, numbers, symbols, punctuation, and the like that constitute the interactive form 200 are encoded directly, preferably in a form that can be utilized in either an interactive, script mode, or a non-interactive mode.

The script section 302 contains the script information that is used to animate, or control, the form 300 to provide a programmed effect, such as allowing for direct user entry of information on the form, and subsequent transmittal to a remote site. Other programmed effects, such as the rendering of audio-visual presentations, sound effects, automated prompts, and so on, may also be provided by the contents of the script segment 302. For ease of understanding, an HTML-like encoding of an interactive form is illustrated in FIG. 2, although other programming or scripting languages, and other applications, may also be used, as would be evident to one of ordinary skill in the art in view of this disclosure. Also for ease of understanding, the script section 302 does not include other HTML-like encodings that can be included to affect, for example, the appearance of the text segment 301. Copending U.S. patent application "Invisible Encoding of Attribute Data in Character Based Documents and Files", U.S. Ser. No. 09/333,632, filed Jun. 15, 1999 for Keith Ahern, presents the encoding of attributes, such as font size, bold, italics, and so on, that affect the appearance of text elements in a document, and is incorporated by reference herein.

The example script elements 310, 350, 360, 370, 380, correspond to the HTML tag elements 110, 150, 160, 170, 180, respectively, of FIG. 1. The script elements 310, 380 mark the beginning and end of the script program that effects the interactive document 200. Each text element in the text segment 301 of the form 300 is identifiable by a location parameter. Preferably, an X,Y coordinate pair is utilized to identify any position within the text segment 301. The coordinates in the example of FIG. 2 correspond to text lines and character position within each line, although other common coordinate systems, such as pixel locations, may also be used. Script element 350, for example, is the HTML-input tag for accepting a user entry corresponding to the user's name, at 355 in the text segment 301, following the text caption "Name (First, Last):". The name entry 355 is illustrated as beginning at the $20^{th}$ character location on the $6^{th}$ text line. In accordance with this invention, the script element 350 contains a location parameter 351 that indicates a corresponding coordinate of 20,6. An application that is compatible with this encoding will effect the appropriate action corresponding to the script element 350 at coordinates 20, 6 of the rendered form. That is, it will place the input box for accepting the user's name at location 20,6 of the text-segment 301. In like manner, script element 360 contains a location coordinate 15,7 that corresponds to the identified location 365 in the text segment 301, following the text caption "Address:". An application that is compatible with this encoding will place an input box for accepting a user's address input at coordinates 20, 6 of the rendered form. Finally, the script element 370 contains a location coordinate 60,9 that specifies a location for placing a "Submit" button, such that the form will be rendered by a compatible application similar in appearance to the form 200 in FIG. 1. Note that, because the script segment 302 can contain conventional script programming elements, augmented by location parameters, an output can be rendered that is identical to that produced by conventional scripting programs. Note also that, similar to a MIME-encoding, the script segment 302 may contain alternative multiple script encodings, corresponding to different device-dependent features, different application languages, and so on. Note however, as contrast to the conventional MIME-encoding, the form 300 of a preferred embodiment does not contain redundant encodings of the content information.

In accordance with this invention, by segregating the text elements from the scripting elements, all text-compatible devices can produce an image that is similar in appearance to form 300 of FIG. 2. In this manner, a legacy application that displays the contents of the formatted file 300 directly will provide for a meaningful and easy to read rendition 301 of the text information. Although the lower portion of the form 300 contains the script segment 302, the upper, text, segment 301 of the form 300 can be used, for example, as a printed form that can be mailed or facsimile-transmitted to the intended recipient. As would be evident to one of ordinary skill in the art, instructions for manually processing the form could be included in the text segment 301, and script elements could be provided in the script segment 302 that modify or overwrite these instructions. In this manner, a rendering system that is not compatible with this encoding format will present the text information that contains, for example, a mailing address, whereas a rendering system that is compatible with this format may replace the mailing address with a hypertext link to an e-mail address. This ability to present alternative forms of information in dependence upon whether the receiving application is compatible with this encoding format can also be used to provide a level of security from eavesdroppers. For example, information that is to remain secret can be provided via the script elements only in response to an interactive query, for example. In like manner, the script segment 302 of the encoded document could be communicated as a separate document from the text segment 301, such that an eavesdropper could only discern the private information by receiving and processing both communicated segments 301 and 302. The features and enhancements that can be provided are limited only by the capabilities of the underlying scripting system used.

The decoding of the formatted file 300 is facilitated by the use of a script section delimiter "{script:" 303 that identifies the end of the text 301 and the beginning of the script section 302. An application that is compatible with the format of the formatted file 300 recognizes this predefined delimiter, and thereafter interprets the subsequent information as location-encoded scripts. The particular choice of characters for the script segment delimiter 303, "{script:" is presented here for illustrative purposes only. In a preferred embodiment, a sequence of characters is selected that is highly likely to be unique; that is, a sequence that has a high likelihood of not coincidently appearing within the text 301, for example "qx73gh#$6^2". Alternatively, the script section delimiter can be deduced from the content of the formatted file 300. For example, the application may process the formatted file 300 from the end toward the beginning, noting the occurrences of identifiable script-element pairs, such as pair 310, 380. The beginning of the script segment 302 is identified by the first absence of an identifiable script-element pair. These and other techniques for delineating distinguishable segments of information, or clusters, are common to one of ordinary skill in the art.

As noted above, the script segment 302 in the example of FIG. 2 will appear at the end of the text 301; equivalently, the script segment 302 could appear at the beginning of the text 301. In accordance with another aspect of this invention, the script elements in a preferred embodiment are encoded using "invisible" character codes. That is, the control information 210 is encoded into a group of characters that are invisible when rendered, and thus, the rendering of the encoded document 200 will only produce a visible effect corresponding to the content-material. For the purposes of this invention, a blank space is considered an "invisible" character, even though it produces a "white" space upon display. In like manner, blank lines are included in the definition of "invisible".

Figure 3A:
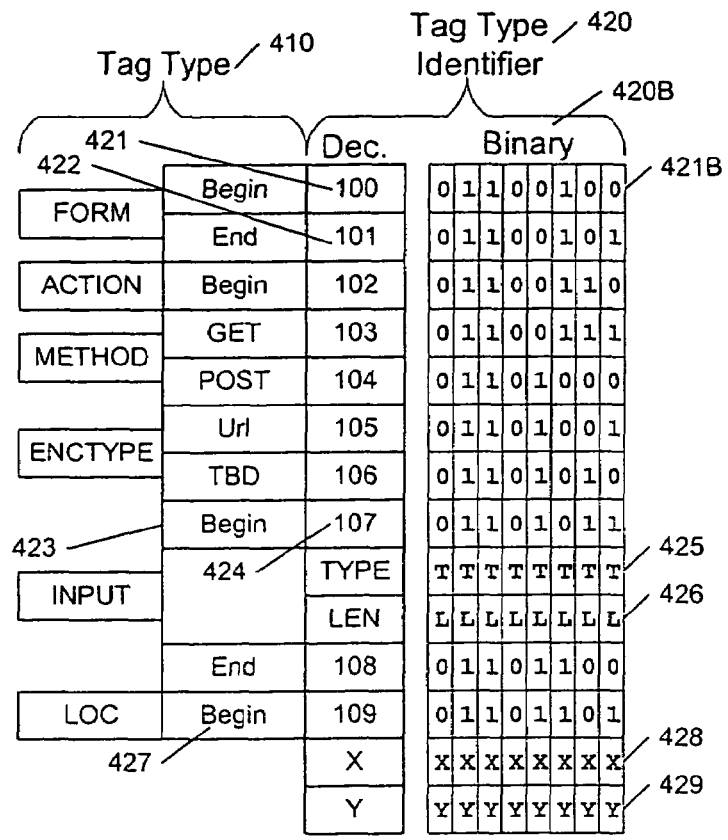
FIGS. 3A–3C illustrate an example invisible encoding of script elements in accordance with another aspect of this invention.
Figure 3B:
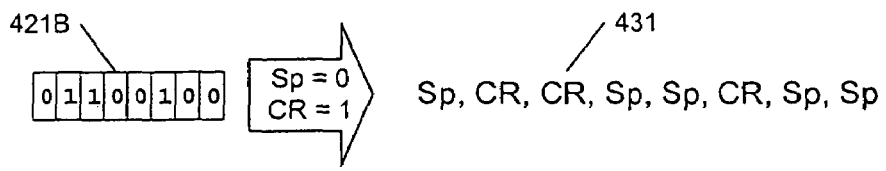
Figure 3C:
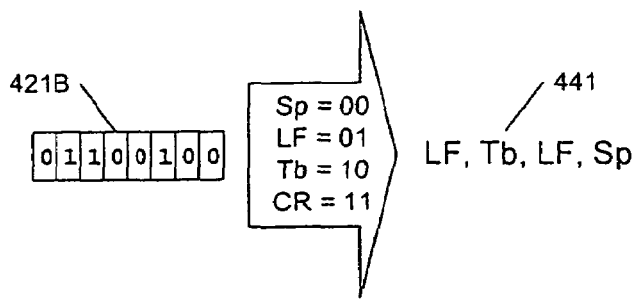

FIGS. 3A–3C illustrate examples of a creation of invisible sequences corresponding to script elements comprised of HTML-like tag elements. Illustrated in FIG. 3A, each type of tag element 410 is uniquely defined by a tag-type identifier 420. The definition of each tag-type identifier 420 can be predefined, or the mapping of unique identifiers to tag-types can be defined for each encoded document. For ease of understanding, the mapping of tag-types to tag-type identifiers is assumed herein as being predefined, alternative data mapping techniques being common in the art. As illustrated in FIG. 3A, a "begin form" tag-type has an identifier of "100" 421, an "end form" tag-type has an identifier of "101" 422, and so on. Common in the art, some tag-types have associated parameters. For example, a "begin input" tag-type 423 has an identifier of "107" 424, and this identifier is followed by parameters that define the type 425 and length 426 of the field used to accept the user input. In like manner, an encoding of the X 428 and Y 429 coordinates follows the "begin location" tag element 427. To distinguish tag element identifiers 421, 422, etc. from an encoding of the parameters used, for example, in the "ACTION=" field 311 of the form tag 310, any one of a variety of common techniques may be employed. For example, a recognition of the particular tag type can be used to distinguish the occurrence of parameters, or, such parameters may be encoded between specific distinguishing delimiters, such as an "escape" character, and so on.

The binary representation 420B of the value of each tag-type identifier 420 is illustrated in FIG. 3A. In accordance with one example embodiment of this invention, an invisible sequence is created for each tag element by encoding the sequence of binary (0–1) values in the binary representation 420B as a sequence of invisible characters. Illustrated in FIG. 3B, for example, a "space" (Sp) is used to represent a logic "0", while a "carriage return" (CR) is used to represent a logic "1". Using this representation, the example binary encoding 421B of a "begin form" tag element, 01100100, is encoded as the sequence: Sp-CR-CR-Sp-Sp-CR-Sp-Sp 431. In like manner, the binary representation of the location coordinates associated with each tag element, and the binary representation of any parameters associated with each tag element are similarly encoded. By using "invisible" characters to encode the script elements, their associated coordinates, and any other parameters associated with the script elements, a direct display of the encoded script elements will merely produce blank spaces and blank lines at the end of the text 301. Note that the example embodiments place the encoded script elements at the end of the document, for ease of understanding. Because "invisible" characters are used to encode the script information, these characters may be placed in other regions of the encoded document, such as within the margins around the text, between paragraphs, and so on.

Alternative encoding means for producing "invisible" sequences corresponding to the script information will be evident to one of ordinary skill in the art. Illustrated in FIG. 3C, for example, is an encoding that uses four "invisible" characters to represent pairs of binary digits: a "space" (SP)

represents a 00 pair, a "line feed" (LF) represents a 01 pair, a "tab" (Tb) represents 10, and a "carriage return" (CR) represents 11. Using this representation, the 01100100 421B representation of a "begin form" tag element is encoded as the sequence: LF-Tb-LF-Sp 441. The above referenced copending U.S. patent application "Invisible Encoding of Attribute Data in Character Based Documents and Files", presents alternative means for invisibly encoding data; including the use of "backspace" characters that have the effect of "erasing" the encoded data. For example, using this alternative technique, each "visible" script element 310–380 of segment 302 in FIG. 2 can be followed by a number of backspace characters corresponding to the length of the visible script elements 310–380. In this manner, the direct display of a visible sequence of characters followed by a sequence of an equal number of backspaces will not be "visible", and will not produce "white space" on the display. That is, the conventional "cursor placement" pointer will be advanced after producing the visible characters, then decremented for each backspace, resulting in an effective stationary cursor placement pointer. In a printing device, the print head may produce a series of overstrikes as the print head advances to produce the characters, then regresses to effect the backspaces, then advances to produce the characters of the next script element, then regresses to effect the backspaces, and so on. In some applications, the printing and overstriking of a few characters at the end of a text document may be preferable to the printing of blank spaces and lines at the end of the text document. Otherwise, the encoding presented with respect to FIG. 3 that uses all invisible characters would be preferred. In like manner, some legacy devices do not "process" backspace characters, displaying instead a symbol representing the backspace character. Although each of these alternatives provides, on most devices, a group of characters that are invisible when rendered, if maximum compatibility with legacy devices is desired, the encoding presented with respect to FIG. 3 is preferred. A display application that is compatible with this format will process the data in the formatted file as text until it encounters the script section delimiter 303. Thereafter it will process each script element, ignoring the backspace characters, and appropriately effecting the programmed scripting of the document in accordance with the function of each script element. Note also that the referenced copending patent application also presents a method of invisibly encoding control codes within the body of the text of the document, using, for example backspace characters after each conventionally encoded script element or component. In like manner, each script element of FIG. 1 may be appended with a corresponding number of backspace characters, thereby effectively "erasing" the script elements when viewed on a conventional display device. Such an encoding of the script element within the body of the text segment is termed an "in-line" format encoding.

The encoding of the script elements may be effected by manually creating the script element segment 302, with corresponding coordinates corresponding to the location within the text segment 301 that the script element applies, or, with an appropriate number of backspaces or other erasing characters to effect an invisible in-line encoding. Such a manual process can be tedious, error-prone, and difficult to modify. In a preferred embodiment of this invention, an encoder is provided that process a conventionally scripted document and produces therefrom an encoded document in accordance with this invention.

Figure 4:
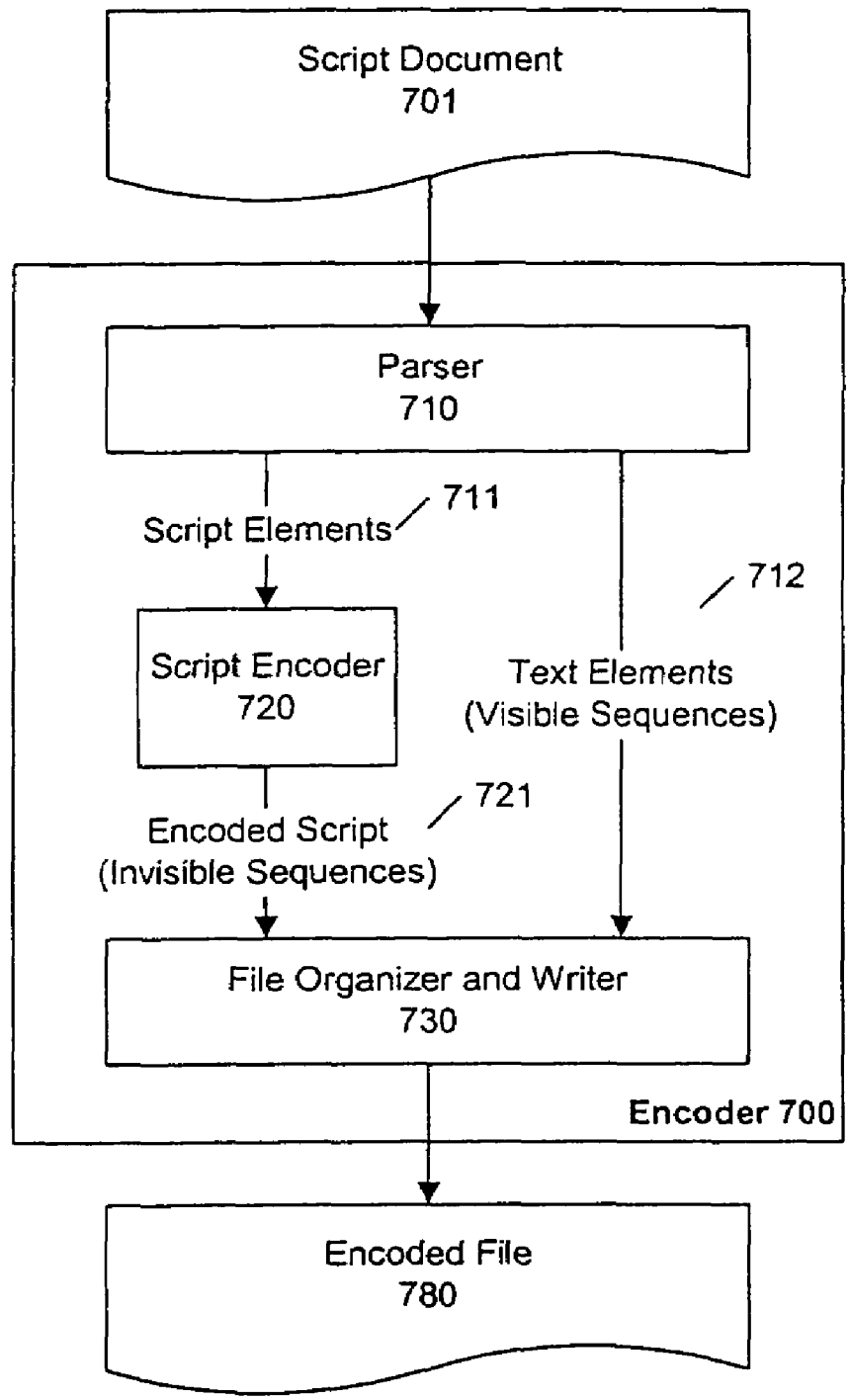
FIG. 4 illustrates an example block diagram of an encoder for encoding a script document in accordance with this invention.

FIG. 4 illustrates an example block diagram of an encoder 700 that processes a scripted document 701 to produce an encoded file 780. The encoded document may be any one of a variety of forms, such as a computer file, a transmitted sequence of characters or symbols, a block of memory, and so on. The encoder 700 includes a parser 710, a script encoder 720, and a file organizer and writer 730. The parser 710 distinguishes text elements in the document 701 from script elements. Text elements 712 are communicated to the file organizer and writer 730, and script elements 711 are communicated to the script encoder 720. If tags are utilized, as in FIG. 3, the script encoder 720 encodes the script into a tag-type identifier, if it is not already thusly encoded. If the invisible-sequence feature of this invention is being employed, the script encoder 720 also encodes the script element into an invisible sequence, using, for example, the encodings presented above with regard to FIG. 3B or 3C. The encoded script sequence 721 is communicated to the file organizer and writer 730. If in-line encoding is not being employed, the location of each script element 711 in relation to the text elements 712 is also communicated as an encoded coordinate, also using the techniques discussed above.

The file organizer and writer 730 prepares the text 712 and script 721 information for storage in an encoded file 780. The term "file" is used in a general sense herein, meaning a composite sequence of data. It includes, for example, a file on a computer system, a sequence of bytes in memory, a sequence of packets that are communicated over a network, and so on. If an in-line encoding of invisible sequences is being employed, the file organizer and writer 730 merely writes the text elements 712 and encoded script sequences 721 to the encoded file 780 in the order in which they appear in the document 701. If in-line encoding is not being employed, the text elements 712 are each written directly to the encoded file 780, followed by each of the encoded script sequences, as discussed with regard to FIG. 2.

Figure 5:
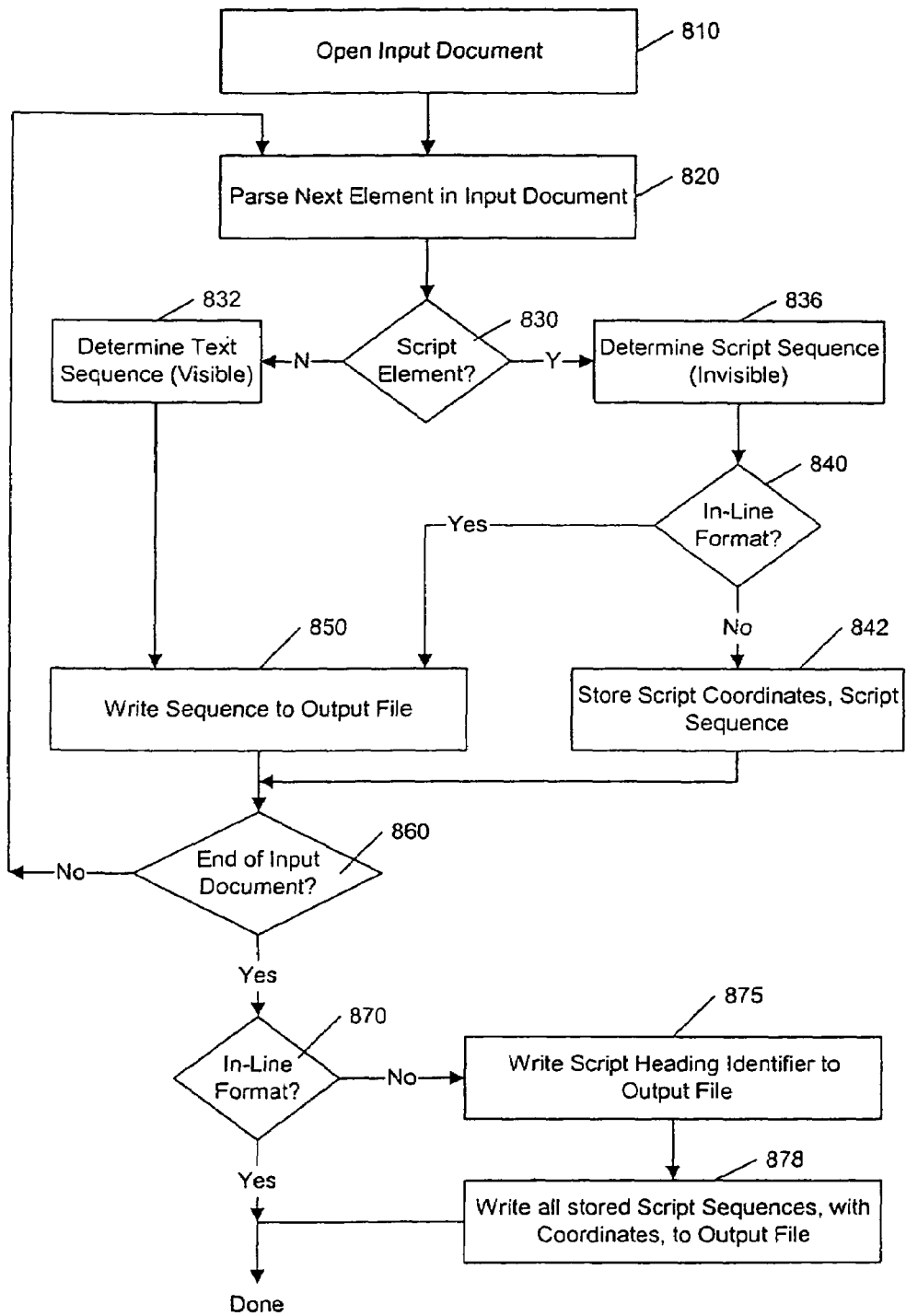
FIG. 5 illustrates an example flow diagram for encoding a script document in accordance with this invention.

FIG. 5 illustrates an example flow diagram for encoding a scripted document in accordance with the various aspects of this invention. At 810 the input document is opened for processing. The block 820 parses the input document for text elements and script elements.

If, at 830, the next element in the input document is a script element, the corresponding script sequence is determined, at 836. If in-line encoding is not being employed, the block 836 includes the determination of the location coordinate for this script element. If the invisible encoding aspect of this invention is being utilized, the block 836 converts the script element and associated coordinates and other parameters into an invisible sequence. If, at 840, in-line encoding is not being employed, the encoded script sequence is temporarily stored, at 842, for subsequent appending to the end of the text section of the output file. If, at 840, in-line encoding is being employed, the invisible sequence corresponding to the script element is communicated to the block 850 for writing to the output file in the order in which it appears in the input document.

If, at 830, the next element in the input document is not a script element, the corresponding text sequence is determined, at 832, and communicated to the block 850 for writing to the output file. Typically, block 832 merely communicates the text elements directly to block 850 for writing to the output file, but if any reformatting of the text of the input document is required, such as a conversion into ASCII character codes, it is performed at this block 832.

After the sequence corresponding to the element in the input document is written to the output file, at 850, or stored for subsequent use, at 842, the system loops back, via 860 to 820, to parse the next element, and this process is continued until the end of the input document.

If, at 870, the in-line formatting has not been used, a delimiter marking the start of the script section is written to the output file, at 875, and each of the stored script sequences, with its corresponding location coordinate is written to the output file, at 878. As noted above, because these sequences are placed in the output file after all of the text elements, the direct display of the output file will result in a rendering of the textual content of the input document in an easy to read format. That is, if the output file is rendered for display by an application that is not "compatible" with the encoded format discussed herein, the initial section of the output file will still be rendered as a text document, with no intervening visually-disturbing script elements.

Figure 6:
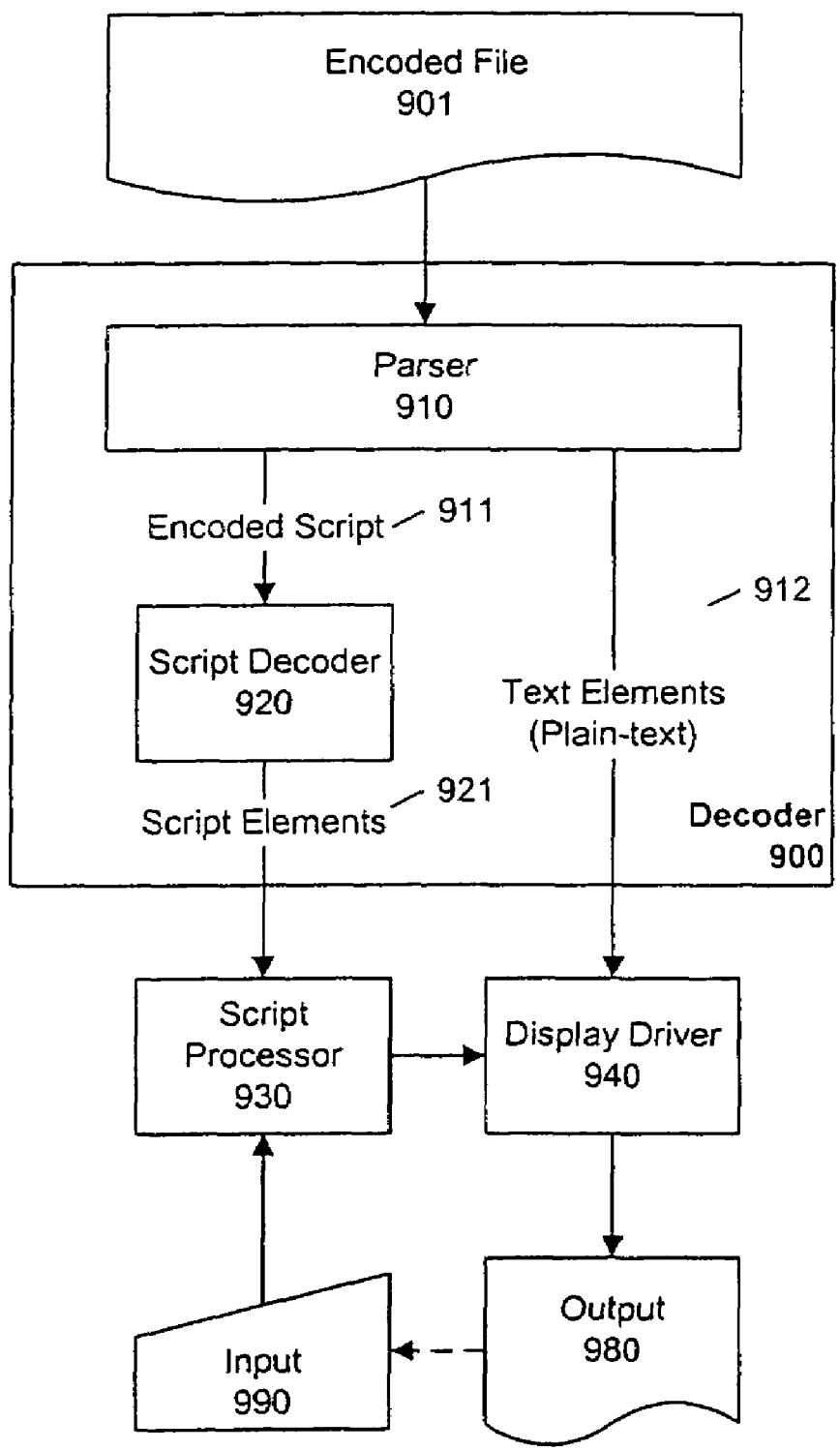
FIG. 6 illustrates an example block diagram of a decoder for decoding a script document that is encoded in accordance with this invention.

FIG. 6 illustrates an example block diagram of a compatible decoder 900 that operates in accordance with the various aspects of this invention. The decoder 900 processes an encoded file 901 to produce the text elements 912 and script elements 921 corresponding to the input document that was used to produce the encoded file 901. The decoder 900 includes a parser 910 and a script decoder 920.

The parser 910 delineates the text elements from the encoded scripts. If an in-line encoding of scripts is employed, the parser 910 includes a script recognition system that recognizes each encoded script 911 as it occurs in the encoded file 901; otherwise, the parser 910 includes a script section delimiter recognizer that serves to identify the end of text elements 912 and the start of script elements 911. As noted above, techniques for distinguishing sections of files, or types of information data, are common in the art. The text elements 912 are provided directly to a display driver 940. As previously noted, the encoded file 901 may be a computer file, a sequence of bytes in a computer memory, a sequence of packets on a communications medium, and so on. In like manner, the terms display 980 and display driver 940 are used in a general sense to include conventional computer displays and printers, and will be recognized by one of ordinary skill in the art as including intermediate display means such as files, web pages, applets, wavelets, cookies, and so on that contain information for producing a rendering via rendering applications such as web browsers and other viewing means.

The encoded script sequences 911 are decoded by the script decoder 920, and provided to a conventional script processor 930 to provide a programmed effect, typically via the display driver 940. As illustrated, the programmed effect may include the reception of information provided via an input device 990, typically in response to the information provided via the output device 980.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the encoded script sequences have been presented as being placed at the end of the text section of the encoded output file, similar to "end-notes" in a document. Alternatively, the encoded script sequences may be placed at the end of each text page or section, similar to "foot-notes", or "chapter-notes" in a document. The particular structure and sequences provided in this disclosure are intended for illustrative purposes. For example, the display of the content information via the decoder 900 has been presented as a rendering of the content information with the programmed effects of the script elements. Alternatively, for a rapid immediate display of information, the decoder 900 can be configured to render the content information immediately to a display, and then apply the effects corresponding to the script elements. In this manner, for example, a download of an encoded document 901 from an Internet site will be presented immediately, and then the programmed effects will be applied as time and bandwidth allow, thereby allowing a user to truncate the reception of the script elements, based on the received content information.

The structure and functions contained in the figures are presented for illustration purposes. Various arrangements may also be utilized for improving the performance of the example systems. For example, the parser 910 may be designed with multiple ports to the encoded file 901, one port accessing the beginning of the text segment 301, and the other accessing the beginning of the script section 302, thereby providing a parallel processing of the encoded file 901. In like manner, the encoding and decoding tasks may be embodied within conventional devices, such as scripting tools for processing MIME, HTML, JAVA, XML, and other encodings. These and other system optimization techniques will be evident to one of ordinary skill in the art in light of this disclosure and are within the intended scope of the following claims.

I claim:

1. A method of producing an electronic document, comprising:
   providing, without displaying, a first text portion, the first text portion exclusive of script;
   providing, without displaying, a first script portion, the first script portion exclusive of text, and the first script portion including at least one location dependent parameter identifier and at least one location coordinate; and
   rendering the electronic document;
   wherein the first text portion comprises visible characters, the first script portion consists of invisible characters, and the at least one location parameter identifier in combination with the at least one location coordinate, directs the application of at least a subset of the first script portion to that location in the first text portion specified by the at least one location coordinate, and wherein rendering the electronic document by an application that displays the contents of a formatted file directly results in the display of the first text portion without the display of the script portion.

2. The method of claim 1, further comprising including the first text portion and the first script portion in a single file.

3. The method of claim 1, further comprising communicating the first text portion, and communicating the first script portion, wherein the first text portion and the first script portion are communicated separately.

4. The method of claim 1, wherein rendering comprises displaying the first text portion without regard to the first script portion, and without displaying the first script portion.

5. The method of claim 1, wherein rendering comprises formatting the first text portion in accordance with the first script portion, and without displaying the first script portion.

6. The method of claim 5, further comprising replacing at least one of the visible characters of the first text portion, with one or more visible characters determined by the first script portion.

7. The method of claim 1, wherein the location coordinate comprises a character position number.

8. The method of claim 1, wherein the location coordinate comprises a line number and a character position number.

9. The method of claim 1, wherein each of the at least one location dependent parameter identifiers is associated with one of the at least one location coordinates.

10. The method of claim 1, wherein visible characters comprise codes that when processed by a display application result in the display of characters; and wherein invisible characters comprise codes that when processed by the display application do not result in the display of characters.

* * * * *